United States Patent
Jimbo et al.

(10) Patent No.: US 9,151,332 B2
(45) Date of Patent: Oct. 6, 2015

(54) POWER TRANSMISSION APPARATUS

(71) Applicant: AISIN SEIKI KABUSHIKI KAISHA, Kariya-shi (JP)

(72) Inventors: Suguru Jimbo, Tokai (JP); Yoshitaka Inoshita, Chita-gun (JP); Makoto Tone, Chiryu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 14/158,234

(22) Filed: Jan. 17, 2014

(65) Prior Publication Data

US 2014/0221105 A1 Aug. 7, 2014

(30) Foreign Application Priority Data

Feb. 6, 2013 (JP) ................................. 2013-021812

(51) Int. Cl.
 *F16D 7/02* (2006.01)
 *F16F 15/139* (2006.01)
 *F16F 15/14* (2006.01)

(52) U.S. Cl.
 CPC .............. *F16D 7/02* (2013.01); *F16F 15/1397* (2013.01); *F16F 15/145* (2013.01)

(58) Field of Classification Search
 CPC ........ F16D 7/02; F16F 15/1397; F16F 15/145
 USPC ............... 464/46, 68.2, 68.4, 68.41; 192/201; 74/574.2
 See application file for complete search history.

(56) References Cited

U.S. PATENT DOCUMENTS

| | | | | |
|---|---|---|---|---|
| 5,520,271 A | * | 5/1996 | Kohno et al. | ............ 74/574.2 X |
| 8,651,965 B2 | * | 2/2014 | Amano et al. | .................. 464/46 |
| 2009/0294239 A1 | | 12/2009 | Nakagaito et al. | |
| 2014/0221106 A1 | * | 8/2014 | Jimbo et al. | |

FOREIGN PATENT DOCUMENTS

JP 2003-4101 A 1/2003

* cited by examiner

*Primary Examiner* — Gregory Binda
(74) *Attorney, Agent, or Firm* — Buchanan Ingersoll & Rooney PC

(57) ABSTRACT

A power transmission apparatus includes a first rotation member connected to a first rotation shaft, a second rotation member connected to a second rotation shaft, a third rotation member provided between the first rotation member and the second rotation member, a damper portion provided between the first rotation member and the third rotation member to absorb a torque fluctuation between the first rotation shaft and the second rotation shaft, a torque limiter portion arranged between the second rotation member and the third rotation member to transmit a torque equal to or smaller than a predetermined value, the torque limiter portion restricting a torque transmitted between the second rotation member and the third rotation member from exceeding the predetermined value in a case where a torque greater than the predetermined value is input to the torque limiter portion, and a dynamic vibration absorber provided at the second rotation member.

17 Claims, 6 Drawing Sheets

POWER TRANSMISSION APPARATUS

CROSS REFERENCE TO RELATED APPLICATIONS

This application is based on and claims priority under 35 U.S.C. §119 to Japanese Patent Application 2013-021812, filed on Feb. 6, 2013, the entire content of which is incorporated herein by reference.

TECHNICAL FIELD

This disclosure generally relates to a power transmission apparatus.

BACKGROUND DISCUSSION

A known power transmission apparatus disclosed, for example, in JP2003-4101A includes two rotation members connected to each other by a damper portion, and a dynamic vibration absorber formed by a centrifugal force pendulum device provided at one of the two rotation members. In the aforementioned power transmission apparatus, for example, one of the rotation members is connected to an internal combustion engine for a vehicle while the other of the rotation members is connected to a transmission of the vehicle so that a power transmission is performed between the internal combustion engine and the transmission.

According to the aforementioned power transmission, in a case where resonance of the damper portion occurs at a start or in a low revolution state of the internal combustion engine, for example, a large vibration may be input to the dynamic vibration absorber, which may cause component members of the dynamic vibration absorber to collide with one another by a large force.

A need thus exists for a power transmission apparatus which is not susceptible to the drawback mentioned above.

SUMMARY

According to an aspect of this disclosure, a power transmission apparatus includes a first rotation member connected to a first rotation shaft to be integrally rotatable with the first rotation shaft, a second rotation member connected to a second rotation shaft to be integrally rotatable with the second rotation shaft, a third rotation member provided between the first rotation member and the second rotation member to be integrally rotatable with the first rotation member and the second rotation member, a damper portion provided between the first rotation member and the third rotation member to absorb a torque fluctuation between the first rotation shaft and the second rotation shaft, a torque limiter portion arranged between the second rotation member and the third rotation member to transmit a torque equal to or smaller than a predetermined value between the second rotation member and the third rotation member, the torque limiter portion restricting a torque transmitted between the second rotation member and the third rotation member from exceeding the predetermined value in a case where a torque greater than the predetermined value is input to the torque limiter portion, and a dynamic vibration absorber provided at the second rotation member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First to fourth embodiments will be explained with reference to the attached drawings. The embodiments include similar component members which bear the same numeral references and repeated explanations are omitted.

Figure 1:
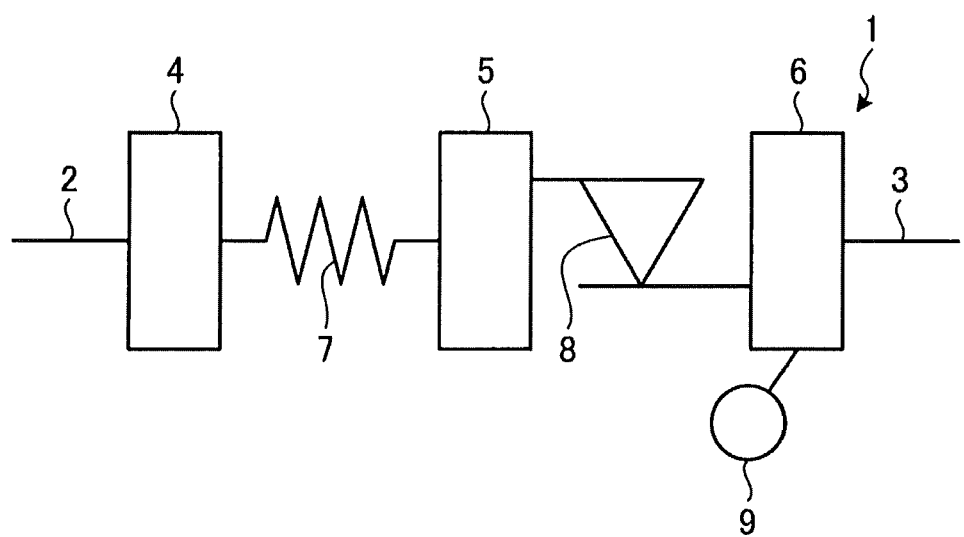
FIG. 1 is a schematic view of a power transmission apparatus according to a first embodiment disclosed here.
Figure 2:
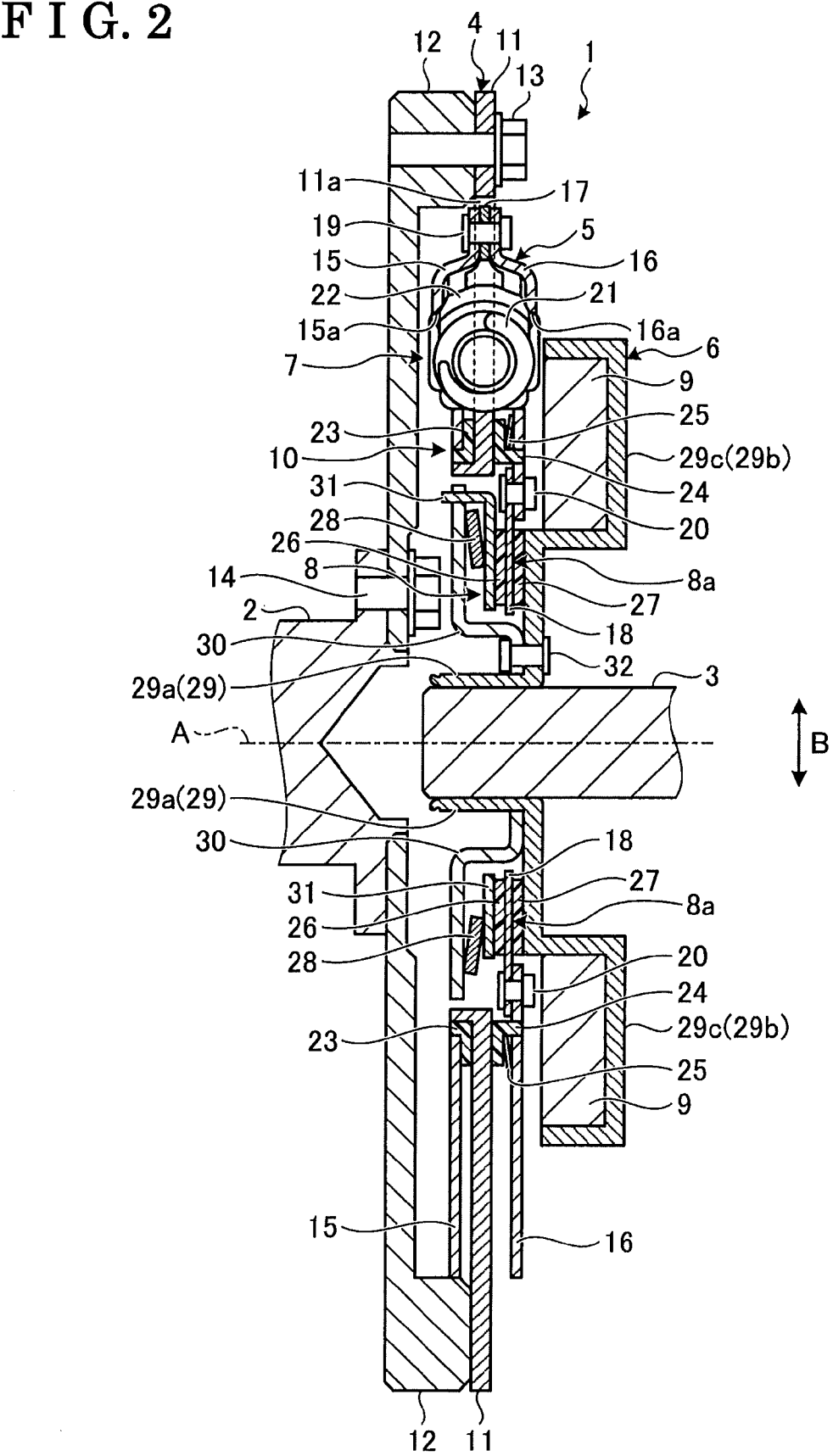
FIG. 2 is a cross-sectional view of the power transmission apparatus according to the first embodiment.

The first embodiment will be explained with reference to FIGS. 1 and 2. As illustrated in FIGS. 1 and 2, a power transmission apparatus 1 serving as a torque fluctuation absorber is provided, for example, between an output shaft 2 of a power source and an input shaft 3 of a passive portion (i.e., a driven portion). A power transmission is performed between the output shaft 2 and the input shaft 3. The power transmission apparatus 1 includes a function for absorbing, i.e., damping or restraining, torque fluctuation or torsional vibration generated by torsion between the output shaft 2 and the input shaft 3, for example. The power transmission apparatus 1 constitutes, together with the output shaft 2 and the input shaft 3, a power transmission passage. The power source corresponds to an internal combustion engine or an electric motor, for example, and the passive portion corresponds to a transmission or a transaxle, for example. In the present embodiment, the output shaft 2 serves as a first rotation shaft while the input shaft 3 serves as a second rotation shaft. A rotation center axis of the power transmission apparatus 1, a rotation center axis of the output shaft 2, a rotation center axis of the input shaft 3, and a rotation center axis of each rotation member of the power transmission apparatus 1 which will be explained later are coaxial with one another. Thus, the aforementioned rotation center axes will be hereinafter referred to as a rotation axis A as illustrated in FIG. 2. In addition, in the following explanation, a radial direction, a circumferential direction, and an axial direction correspond to a radial direction of a rotation member 4 (i.e., a direction along an arrow B in FIG. 2 and a direction orthogonal to the rotation axis A), a circumferential direction of the rotation member 4 (i.e., a direction around the rotation axis A), and an axial direction of the rotation member 4, respectively, unless otherwise specified.

As illustrated in FIG. 2, the power transmission apparatus 1 includes, for example, three (i.e., plural) rotation members (a mass body, a flywheel mass body, and an inertia body) constituted by rotation members 4, 5 and 6, a damper portion 7, a torque limiter portion 8, a dynamic vibration absorber 9, and a hysteresis portion 10.

The rotation members 4 to 6 are serially connected to one another at the power transmission passage. The rotation member 4 is connected to the output shaft 2 to be integrally rotatable therewith. The rotation member 6 is connected to the input shaft 3 to be integrally rotatable therewith. The rotation member 5 is arranged between the rotation members 4 and 6 to be integrally rotatable therewith. In the first embodiment, the rotation member 4 serves as a first rotation member, the rotation member 6 serves as a second rotation member, and the rotation member 5 serves as a third rotation member.

The damper portion 7 and the hysteresis portion 10 are arranged between the rotation members 4 and 5. The damper portion 7 and the hysteresis portion 10 are provided in parallel with each other at the power transmission passage. The damper portion 7 transmits torque between the rotation members 4 and 5 while absorbing torque fluctuation between the output shaft 2 and the input shaft 3 by elastic deformation. The hysteresis portion 10 damps or restrains the torque fluctuation between the output shaft 2 and the input shaft 3 by hysteresis torque based on friction, for example.

The torque limiter portion 8 is arranged between the rotation members 5 and 6. The torque limiter portion 8 transmits torque equal to or smaller than a predetermined value between the rotation members 5 and 6. In a case where torque greater than the predetermined value is input to the torque limiter portion 8, slippage is generated at the torque limiter portion 8 so that the torque transmitted between the rotation members 5 and 6 is inhibited from exceeding the predetermined value.

The dynamic vibration absorber 9 is provided at the rotation member 6. Specifically, the dynamic vibration absorber 9 is provided at the rotation member 6, not at the rotation member 5 that is connected to the damper portion 7. The dynamic vibration absorber 9 integrally rotates with the rotation member 6. The dynamic vibration absorber 9 absorbs or restrains torsional vibration generated between the output shaft 2 and the input shaft 3.

The power transmission apparatus 1 will be explained in detail with reference to FIG. 2.

The rotation member 4 includes single or plural members. For example, the rotation member 4 includes a plate 11 and connection members 13. The plate 11 is connected and fixed to the output shaft 2 via a flywheel 12. An inner circumferential portion of the flywheel 12 is connected to the output shaft 2 by connection members 14 corresponding to bolts, for example. The rotation member 4 integrally rotates with the flywheel 12 and the output shaft 2. Specifically, the plate 11 is formed by an annular member positioned at a side of the flywheel 12 at which the passive portion (transmission, for example) is provided. That is, the plate 11 is provided at a passive portion side of the flywheel 12. An outer circumferential portion of the plate 11 is fixed or connected to the flywheel 12 by the connection members 13 corresponding to bolts, for example. The plural connection members 13 and the plural connection members 14 are provided in the circumferential direction.

The plate 11 includes window portions 11a. For example, the plural window portions 11a are arranged at intervals in the circumferential direction. Each coil spring 21 serving as a biasing member and a spring, and a pair of seat members 22 are accommodated within each of the window portions 11a. Each of the seat members 22 is arranged between an end surface of the window portion 11a in the circumferential direction and an end portion of the coil spring 21. The end surface of the window portion 11a in the circumferential direction is provided so as to be in contact with and in separation from the seat member 22.

The plate 11 is arranged between first and second thrust members 23 and 24 constituting a portion of the hysteresis portion 10 at an inner circumferential side of the coil springs 21 in the radial direction so that the plate 11 is slidable and rotatable in the circumferential direction.

The rotation member 5 includes single or plural members. For example, the rotation member 5 includes two side plates, i.e., first and second side plates 15 and 16, an intermediate plate 17, and a lining plate 18. Each of the first and second side plates 15 and 16, the intermediate plate 17, and the lining plate 18 serves as a plate.

Each of the first and second side plates 15 and 16 is formed by an annular member. The first side plate 15 is positioned at the passive portion side relative to the flywheel 12, i.e., at a right side of the flywheel 12 in FIG. 2. The second side plate 16 is positioned at the passive portion side relative to the first side plate 15. The first and second side plates 15 and 16 are arranged to overlap each other in the axial direction. The first and second side plates 15 and 16 are connected to each other by a connection member 19 corresponding to a rivet, for example, in a state where the intermediate plate 17 is disposed between outer circumferential portions of the first and second side plates 15 and 16 respectively. Thus, the first and second side plates 15 and 16 integrally rotate with the intermediate plate 17. The intermediate plate 17 and the connection member 19 are positioned at an outer side of the coil spring 21 in the radial direction. The outer circumferential portions of the first and second side plates 15 and 16 are away from each other by means of the intermediate plate 17. At this time, the intermediate plate 17 may be omitted so that the first and second side plates 15 and 16 are directly connected to each other. The first thrust member 23 is disposed between the first side plate 15 and the plate 11, and the second thrust member 24 is disposed between the second side plate 16 and the plate 11.

The intermediate plate 17 is provided at each of the window portions 11a of the plate 11. The intermediate plate 17 and the end surface of each of the window portions 11a in the circumferential direction make contact with each other in a case where torsion is generated at the damper portion 7 so as to function as a stopper for restricting the torsion of the damper portion 7.

The first side plate 15 includes window portions 15a while the second side plate 16 includes window portions 16a. The window portions 15a and 16a are provided closer to the rotation axis A relative to the connection member 19, i.e., provided at a radially inner side relative to the connection member 19. The coil spring 21 and the seat members 22 are accommodated within a pair of the window portions 15a and 16a overlapping in the axial direction. Each of the seat members 22 is disposed between end surfaces of the window portions 15a and 16a in the circumferential direction, and the coil spring 21. The end surfaces of the window portions 15a and 16a are provided so as to be in contact with and in separation from the seat member 22. The end surfaces of the window portions 15a and 16a in the circumferential direction make contact with the intermediate plate 17 in a case where torsion is generated at the damper portion 7 so as to function as a stopper for restricting the torsion of the damper portion 7.

The lining plate 18 is formed by an annular member. The lining plate 18 is connected to an inner circumferential portion of the second side plate 16 by a connection member 20 corresponding to a rivet, for example. A first friction member 26 is positioned at a side of the lining plate 18 at which the power source (engine, for example) is provided, i.e., positioned at a power source side of the lining plate 18. That is, the first friction member 26 is provided at the power source side of the lining plate 18 while a second friction member 27 is positioned at the passive portion side of the lining plate 18. Accordingly, the lining plate 18 is arranged between the pair of friction members, i.e., between the first and second friction members 26 and 27 in the axial direction.

The damper portion 7 includes the coil springs 21 and the seat members 22. The coil springs 21 and the seat members 22 are accommodated within the window portions 11a, 15a, and 16a formed at the plate 11 and the first and second side plates 15 and 16 respectively.

Each of the coil springs 21 is in contact with the seat members 22 arranged at opposing end portions of the coil spring 21 in the circumferential direction. The coil springs 21 are disposed, in the aforementioned manner, between the plate 11 and the first and second side plates 15 and 16. The damper portion 7 transmits torque between the rotation members 4 and 5 and absorbs torque fluctuation between the output shaft 2 and the input shaft 3 by the elastic deformation of each of the coil springs 21. Specifically, the coil springs 21 allow a relative rotation between the plate 11 and the first and second side plates 15 and 16 within a predetermined range and contract by the relative rotation between the plate 11 and the first and second side plates 15 and 16 to absorb shock caused by rotation difference between the plate 11 and the first and second side plates 15 and 16. Each of the coil springs 21 may be formed in a straight shape, formed by a straight-shaped coil spring that is curved in the circumferential direction of the rotation member 4 for assembly, or by an arc spring curved in the circumferential direction of the rotation member 4, for example.

Each of the seat members 22 may be made of synthetic resin material, for example. Thus, abrasion of the coil spring 21 may decrease. At this time, however, the seat member 22 may be made of other material than synthetic resin material, for example, the seat member 22 may be made of metallic material.

The hysteresis portion 10 includes the first and second thrust members 23 and 24, and a disc spring 25.

Each of the first and second thrust members 23 and 24 is formed by an annular member. The first and second thrust members 23 and 24 are arranged at an inner side of the coil springs 21 of the damper portion 7 in the radial direction. In addition, the first and second thrust members 23 and 24 face an end portion of the plate 11 at an inner circumferential side in the axial direction. The first thrust member 23 is arranged at the power source side of the plate 11 to be disposed between the plate 11 and the first side plate 15 in the axial direction. The first thrust member 23 is engaged or connected relative to the first side plate 15 to be relatively non-rotatable and axially movable. The second thrust member 24 is arranged at the passive portion side of the plate 11 to be disposed between the plate 11 and the second side plate 16 in the axial direction. The second thrust member 24 is engaged or connected relative to the second side plate 16 to be relatively non-rotatable and axially movable. The disc spring 25 is disposed between the second thrust member 24 and the second side plate 16, for example, so as to bias the second thrust member 24 towards the plate 11. Because of the biasing force of the disc spring 25, the pair of thrust members, i.e., the first and second thrust members 23 and 24, is in pressure contact with the plate 11. At this time, the first and second thrust members 23 and 24 are slidable relative to the plate 11 in the circumferential direction. The hysteresis portion 10 damps or restrains torque fluctuation between the output shaft 2 and the input shaft 3 by hysteresis torque based on friction, for example, generated between the first and second thrust members 23 and 24, and the plate 11. The first thrust member 23 is also arranged between the first side plate 15 and the plate 11 in the radial direction so as to function as a sliding bearing, i.e., a bush for allowing a relative rotation between the first side plate 15 and the plate 11.

The rotation member 6 includes single or plural members. For example, the rotation member 6 includes a hub member 29, a plate 30 serving as a support plate, and a pressure plate 31.

The hub member 29 is formed by an annular member. The hub member 29 includes a cylindrical portion 29a and a flange portion 29b. The input shaft 3 is inserted to the cylindrical portion 29a so that the input shaft 3 is spline-fitted to an inner peripheral surface of the cylindrical portion 29a, i.e., the input shaft 3 is fitted to the cylindrical portion 29a to be relatively non-rotatable and axially movable.

The flange portion 29b extends outwardly in the radial direction from an end of the cylindrical portion 29a at the passive portion side in the axial direction, i.e., at an opposite side of the power source side in the axial direction. The flange portion 29b is positioned at the passive portion side of the damper portion 7 and the hysteresis portion 10 in the axial direction. The flange portion 29b includes a holding portion 29c in an annular form. The holding portion 29c is positioned, for example, at an outer side of a connection member 32 in the radial direction. The holding portion 29c is in a recess form opening at the power source side, for example. The holding portion 29c in the recess form accommodates the dynamic vibration absorber 9 in an annular form.

The plate 30 formed by an annular member is connected to the hub member 29. Specifically, an inner circumferential portion of the plate 30 is connected to the flange portion 29b by means of the connection member 32 corresponding to a rivet, for example, in a state where the plate 30 is outwardly fitted to the flange portion 29b in the radial direction.

The pressure plate 31 formed by an annular member is connected to the plate 30 to be relatively non-rotatable and axially movable.

The torque limiter portion 8 includes the lining plate 18, the pair of friction members, i.e., the first and second friction members 26 and 27, a disc spring 28, and the pressure plate 31.

Each of the first and second friction members 26 and 27 is formed by an annular member. The first and second friction members 26 and 27 are positioned at the inner side of the coil springs 21 (i.e., the damper portion 7) in the radial direction to face the lining plate 18 in the axial direction. The first friction member 26 is positioned at the power source side of the lining plate 18 to be disposed between the lining plate 18 and the pressure plate 31 in the axial direction. The first friction member 26 is held or connected relative to the pressure plate 31 to be relatively non-rotatable. For example, the first friction member 26 is held by the pressure plate 31 by means of a fitting structure including a projection and a bore. On the other hand, the second friction member 27 is positioned at the passive portion side of the lining plate 18 to be disposed between the lining plate 18 and the flange portion 29b of the hub member 29 in the axial direction. The second friction member 27 is held or connected relative to the hub member 29 to be relatively non-rotatable. For example, the second friction member 27 is held by the hub member 29 by means of a fitting structure including a projection and a bore. At this time, the first and second friction members 26 and 27 may not be held by the pressure plate 31 and the hub member 29 respectively and may be held by the lining plate 18 to be relatively non-rotatable. Each of the first and second friction members 26 and 27 may be made of a material including rubber, synthetic resin, fibers (short fibers or long fibers), and particles for friction coefficient adjustment, for example.

The disc spring 28 is arranged between the plate 30 and the pressure plate 31, for example, to bias the first friction member 26 towards the lining plate 18. Because of the biasing force of the disc spring 28, the first and second friction members 26 and 27 are in pressure contact with the lining plate 18. The torque limiter portion 8 transmits torque equal to or smaller than the predetermined value between the rotation members 5 and 6. At this time, the first and second friction members 26 and 27, and the lining plate 18 integrally rotate with one another without slippage. On the other hand, in a case where torque greater than the predetermined value is input to the torque limiter portion 8, slippage is generated among the first and second friction members 26 and 27 and the lining plate 18 so that the torque limiter portion 8 restricts the torque transmitted between the rotation members 5 and 6 from exceeding the predetermined value. Facing areas, i.e., contact areas, of the first and second friction members 26 and 27 relative to the lining plate 18 in the axial direction form a transmission portion 8a transmitting torque by means of friction. Torque transmission is also performed between the disc spring 28 and both the plate 30 and the pressure plate 31.

The dynamic vibration absorber 9 is in an annular form, for example. The dynamic vibration absorber 9 is configured to accommodate a rolling element serving as a centrifugal force pendulum in a chamber, for example. In the aforementioned configuration, at a time of the rotation of the output shaft 2 (i.e., of the flywheel 12), for example, the rolling element rolls within the chamber by resonating with torsional vibration including a predetermined degree of a power transmission system. Then, the torsional vibration may be absorbed by dynamic vibration absorption performance in association with the rolling of the rolling element. The dynamic vibration absorber 9 is not limited to include the aforementioned configuration and may include a spring or a damper portion, for example.

According to the present embodiment, one of the dynamic vibration absorber 9 and the transmission portion 8a of the torque limiter portion 8 is positioned at the outer side of the other of the dynamic vibration absorber 9 and the transmission portion 8a of the torque limiter portion 8 in the radial direction. For example, in the present embodiment, the dynamic vibration absorber 9 is positioned at the radially outer side of the transmission portion 8a.

In the power transmission apparatus 1 including the aforementioned configuration, torque transmission, i.e., power transmission, is performed between the output shaft 2 (the flywheel 12) and the input shaft 3. For example, the power transmission apparatus 1 transmits torque of the output shaft 2 (i.e., of the flywheel 12) to the input shaft 3. At this time, the damper portion 7 absorbs torque fluctuation between the output shaft 2 and the input shaft 3 by the elastic deformation of the damper portion 7. In addition, the hysteresis portion 10 damps or restrains the torque fluctuation between the output shaft 2 and the input shaft 3 by hysteresis torque based on friction, for example. Further, the dynamic vibration absorber 9 absorbs torsional vibration that is generated between the output shaft 2 and the input shaft 3. In a case where torque exceeding the predetermined value is input to the torque limiter portion 8, the torque limiter portion 8 generates slippage to restrict the torque transmitted between the rotation members 5 and 6 from exceeding the predetermined value. Specifically, the torque limiter portion 8 restricts torque transmission from the rotation member 5 to the rotation member 6. Accordingly, a relatively large vibration, i.e., a relatively large torque, is inhibited from being input to the dynamic vibration absorber 9.

According to the first embodiment, the damper portion 7 is provided between the rotation members 4 and 5, the dynamic vibration absorber 9 is provided at the rotation member 6, and the torque limiter portion 8 is provided between the rotation members 5 and 6. Thus, in a case where the damper portion 7 resonates and the torque limiter portion 8 receives the torque greater than the predetermined value, the torque limiter portion 8 restricts the torque transmitted between the rotation members 5 and 6 from exceeding the predetermined value. Thus, a relatively large vibration, i.e., a relatively large torque, may be restrained from being input to the dynamic vibration absorber 9. As a result, in the present embodiment, the dynamic vibration absorber 9 may be protected and further a long life span of the dynamic vibration absorber 9 may be achieved.

In addition, according to the first embodiment, in a case where the dynamic vibration absorber 9 is formed by a centrifugal force pendulum device, the torque limiter portion 8 restricts the torque transmitted between the rotation members 5 and 6 from exceeding the predetermined value so that a relatively large vibration is restrained from being input to the rolling element serving as the centrifugal force pendulum. An increase of vibration of the rolling element that causes a collision between the rolling element and other members in the dynamic vibration absorber 9 by a large force may be restrained. Further, because a collision between the rolling element and the other members in the dynamic vibration absorber 9 by a large force resulting from the increase of vibration of the rolling element is restrained, the rolling element may be protected. An abnormal noise caused by a contact between the rolling element and the other members in the dynamic vibration absorber 9 may be restrained. Because the dynamic vibration absorber 9 is protected in the aforementioned manner, a thickness of an attachment member of the rolling element, for example, in a case where the dynamic vibration absorber 9 is formed by the centrifugal force pendulum device, may be reduced, which may lead to downsizing of the dynamic vibration absorber 9.

Further, according to the first embodiment, the torque limiter portion 8 includes the transmission portion 8a transmitting the torque by friction, and one of the dynamic vibration absorber 9 and the transmission portion 8a is positioned at the outer side of the other of the dynamic vibration absorber 9 and the transmission portion 8a in the radial direction. Therefore, arrangements of the dynamic vibration absorber 9 and the torque limiter portion 8 may be easily performed, for example.

Furthermore, according to the first embodiment, the dynamic vibration absorber 9 is positioned at the radially outer side of the transmission portion 8a. Thus, as compared to a case where the dynamic vibration absorber 9 is positioned at the radially inner side of the transmission portion 8a, for example, the vibration absorption performance of the dynamic vibration absorber 9 may increase.

Furthermore, according to the first embodiment, the torque limiter portion 8 includes a relatively simple configuration including the first and second friction members 26 and 27, and the disc spring 28. Thus, the dynamic vibration absorber 9 may be protected while a complex configuration of the power transmission apparatus 1 is restrained.

Figure 3:
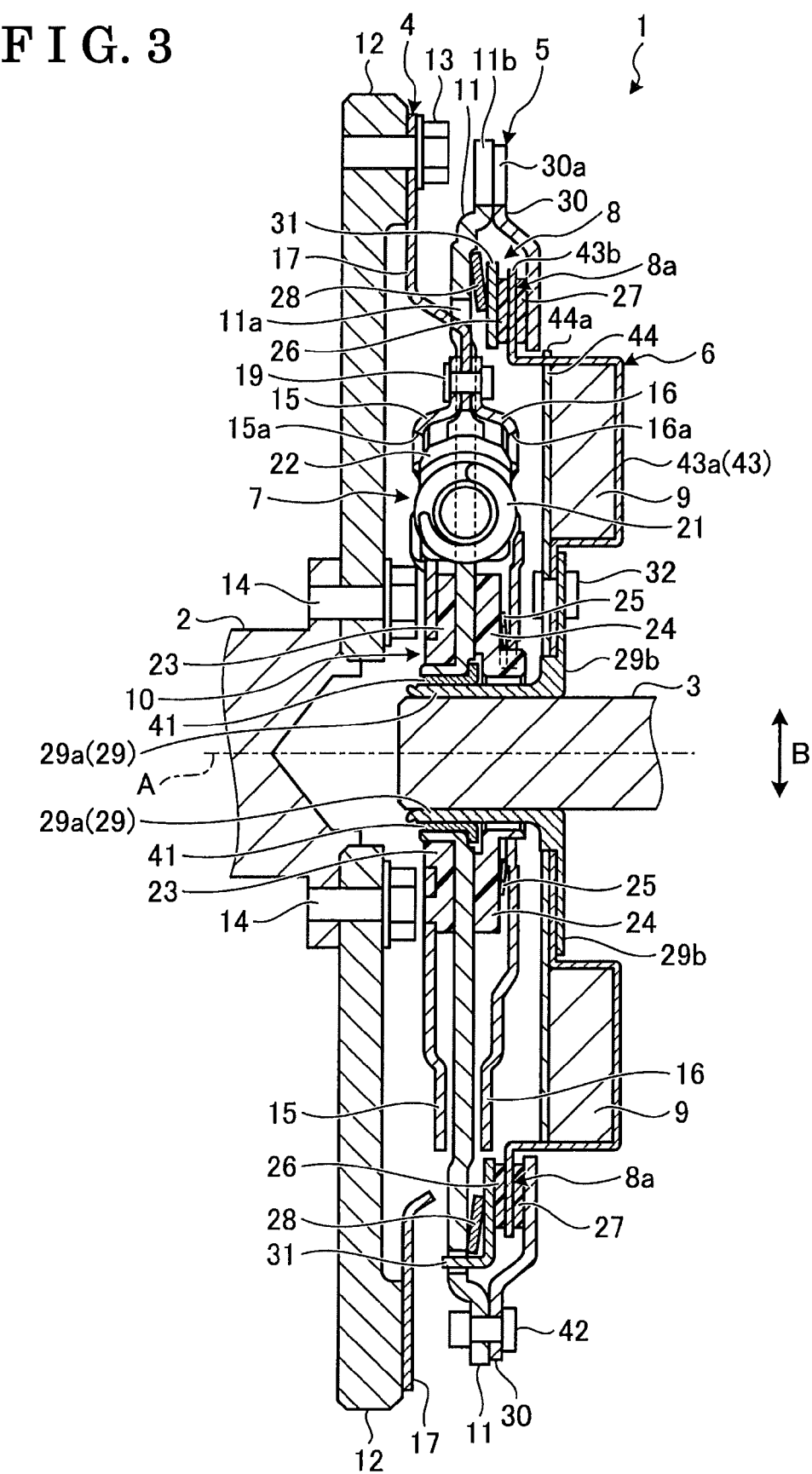
FIG. 3 is a cross-sectional view of the power transmission apparatus according to a second embodiment disclosed here.

The second embodiment will be explained with reference to FIG. 3. As illustrated in FIG. 3, in the second embodiment, the position of the torque limiter portion 8 and the configurations of the rotation members 4 to 6 are mainly different from those of the first embodiment.

One of the torque limiter portion 8 (the transmission portion 8a) and the damper portion 7 (the coil springs 21) is positioned at the radially outer side of the other of the torque limiter portion 8 (the transmission portion 8a) and the damper portion 7 (the coil springs 21). In the second embodiment, for example, the torque limiter portion 8 is positioned at the radially outer side of the coil springs 21.

The rotation member 4 includes, for example, the intermediate plate 17, and the first and second side plates 15 and 16. The intermediate plate 17 is connected and fixed to the output shaft 2 via the flywheel 12. The intermediate plate 17 is positioned at the passive portion side of the flywheel 12. Specifically, an outer circumferential portion of the intermediate plate 17 is connected and fixed to the flywheel 12 by means of the connection member 13 corresponding to a bolt, for example. The intermediate plate 17 and the first and second side plates 15 and 16 are connected to one another by the connection member 19.

The rotation member 5 includes the plate 11, the plate 30 serving as a cover plate, and the pressure plate 31. In the second embodiment, the plate 11 is inhibited from being fixed to the flywheel 12. The plate 11 is rotatably connected to the cylindrical portion 29a of the hub member 29 via a bearing 41. The bearing 41 is positioned and fitted to the radially outer side of the cylindrical portion 29a to rotatably support an inner circumferential portion of the plate 11. The plate 11 and the plate 30 are connected and fixed to each other by a connection member 42 corresponding to a rivet, for example.

The plate 11 includes a cut portion 11b serving as an opening portion while the plate 30 includes a cut portion 30a serving as the opening portion. The cut portions 11b and 30a are formed at respective outer circumferential portions of the plates 11 and 30 and are positioned to be displaced from the connection member 42 in the radial direction. The cut portions 11b and 30a overlap each other so as to be connected in the axial direction. The cut portions 11b and 30a are formed at positions overlapping the connection member 13 in the axial direction. Specifically, in a state where torsion is not generated at the damper portion 7, the cut portions 11b and 30a are provided at the positions overlapping the connection member 13 in the axial direction. The cut portions 11b and 30a are provided so as to allow the connection member 13 to pass through the cut portions 11b and 30a and a usage of a tool for the connection member 13.

The rotation member 6 includes the hub member 29, and plates 43 and 44. In the second embodiment, the holding portion 29c is inhibited from being provided at the hub member 29. Instead, a holding portion 43a is provided at the plate 43.

The plate 43 is formed by an annular member. The plate 43 is provided to overlap the flange portion 29b of the hub member 29 in the axial direction. For example, an inner circumferential portion of the plate 43 is positioned at the power source side of the flange portion 29b. The inner circumferential portion of the plate 43, together with the plate 44, is connected and fixed to the flange portion 29b of the hub member 29 by means of the connection member 32.

The holding portion 43a of the plate 43 is positioned at the outer side of the connection member 32 in the radial direction, for example. The holding portion 43a is formed in a recess form opening at the power source side, for example. The holding portion 43a accommodates the dynamic vibration absorber 9 in an annular form within the recess portion of the holding portion 43a. An outer circumferential portion of the plate 43 extends towards the power source side from the holding portion 43a. A lining portion 43b is provided at the outer circumferential portion of the plate 43. The lining portion 43b in the second embodiment corresponds to the lining plate 18 in the first embodiment.

The plate 44 is formed by an annular member. The plate 44 is arranged to overlap the plate 43 and the flange portion 29b of the hub member 29 in the axial direction. For example, an inner circumferential portion of the plate 44 is positioned at the power source side of the inner circumferential portion of the plate 43. The inner circumferential portion of the plate 44, together with the plate 43, is connected and fixed to the flange portion 29b of the hub member 29 by means of the connection member 32. The plate 44 covers an opening of the holding portion 43a. Engagement portions 44a are formed at an outer circumferential portion of the plate 44. For example, plural engagement portions 44a are arranged at intervals in the circumferential direction. The engagement portions 44a engage with engagement bores serving as engagement portions formed at the plate 43.

In the second embodiment, the torque limiter portion 8 includes the lining portion 43b instead of the lining plate 18 as in the first embodiment.

The first and second friction members 26 and 27 of the torque limiter portion 8 are positioned at the radially outer side of the coil springs 21 (the damper portion 7) to face the lining portion 43b in the axial direction. The first friction member 26 is positioned at the power source side of the lining portion 43b to be disposed between the lining portion 43b and the pressure plate 31 in the axial direction. The first friction member 26 is held and connected to the pressure plate 31 to be relatively non-rotatable. For example, the first friction member 26 is held by the pressure plate 31 by means of a fitting structure including a projection and a bore. On the other hand, the second friction member 27 is positioned at the passive portion side of the lining portion 43b to be disposed between the lining portion 43b and the plate 30. The second friction member 27 is held and connected to the plate 30 to be relatively non-rotatable. For example, the second friction member 27 is held by the plate 30 by means of a fitting structure including a projection and a bore. At this time, the first and second friction members 26 and 27 may not be held by the pressure plate 31 and the plate 30 respectively and may be held by the plate 43 (the lining portion 43b) to be relatively non-rotatable. Facing areas, i.e., contact areas, of the first and second friction members 26 and 27 relative to the lining portion 43b in the axial direction form the transmission portion 8a transmitting torque by friction.

The disc spring 28 of the torque limiter portion 8 is disposed between the plate 11 and the pressure plate 31, for example, to bias the first friction member 26 towards the lining portion 43b. Because of the biasing force of the disc spring 28, the first and second friction members 26 and 27 are in pressure contact with the lining portion 43b.

One of the transmission portion 8a and the dynamic vibration absorber 9 is positioned at the radially outer side of the other of the transmission portion 8a and the dynamic vibration absorber 9. Specifically, in the second embodiment, the transmission portion 8a is positioned at the radially outer side of the dynamic vibration absorber 9.

According to the aforementioned configuration of the second embodiment, the dynamic vibration absorber 9 may be protected in the same way as the first embodiment.

In addition, because one of the transmission portion 8a and the dynamic vibration absorber 9 is positioned at the radially outer side of the other of the transmission portion 8a and the dynamic vibration absorber 9, arrangements of the dynamic vibration absorber 9 and the torque limiter portion 8, for example, may be easily performed.

Figure 4:
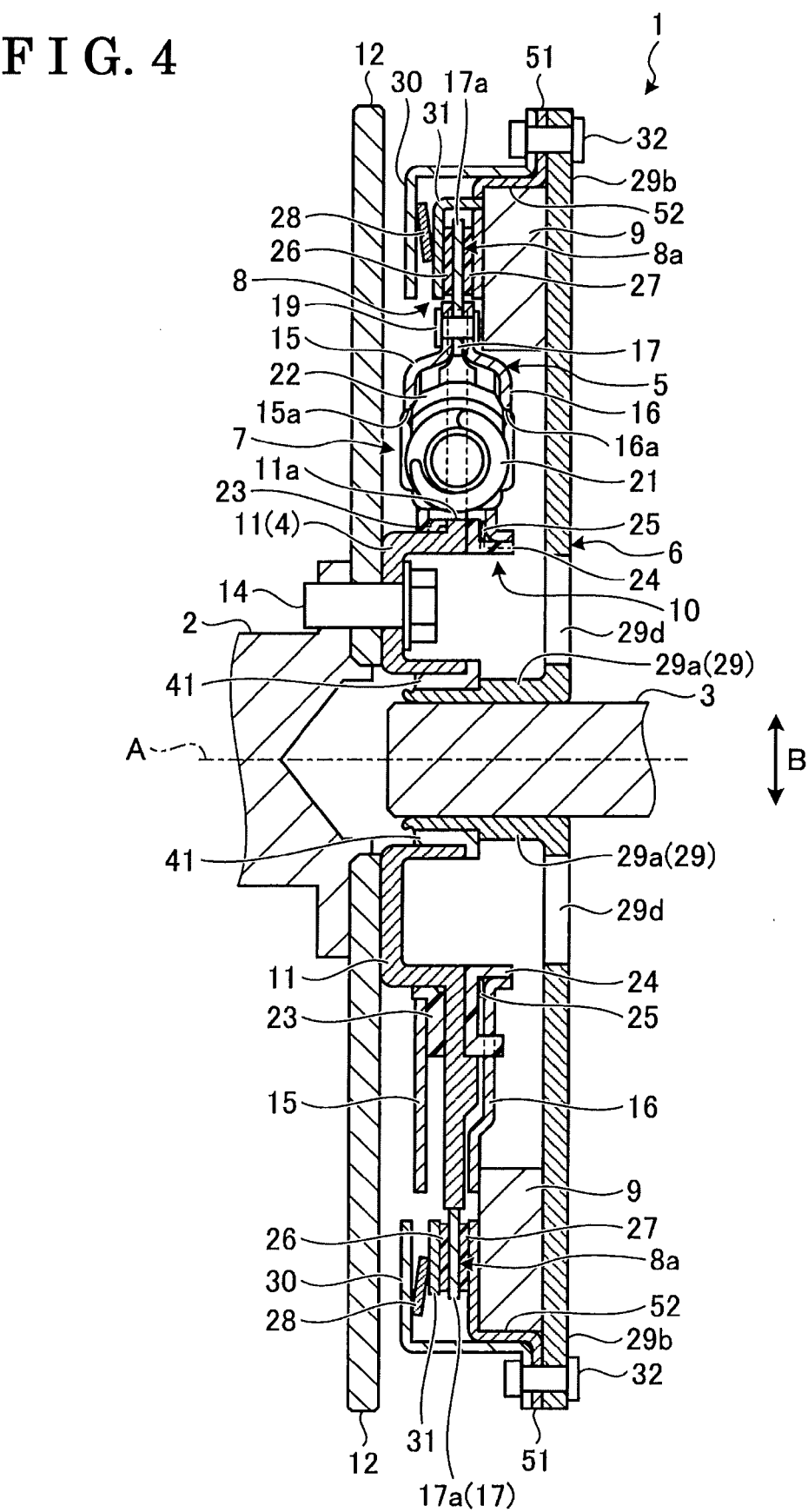
FIG. 4 is a cross-sectional view of the power transmission apparatus according to a third embodiment disclosed here.

The third embodiment will be explained with reference to FIG. 4. As illustrated in FIG. 4, in the third embodiment, the positions of the torque limiter portion 8 and the dynamic vibration absorber 9 and the configurations of the rotation members 4 to 6 are mainly different from those of the first embodiment.

In the third embodiment, one of the torque limiter portion 8 (the transmission portion 8a) and the damper portion 7 (the coil springs 21) is positioned at the radially outer side of the other of the torque limiter portion 8 (the transmission portion 8a) and the damper portion 7 (the coil springs 21). In addition, one of the dynamic vibration absorber 9 and the damper portion 7 (the coil springs 21) is positioned at the radially outer side of the other of the dynamic vibration absorber 9 and the damper portion 7 (the coil springs 21). Specifically, in the third embodiment, the torque limiter portion 8 and the dynamic vibration absorber 9 are positioned at the radially outer side of the coil springs 21. The torque limiter portion 8 and the damper portion 7 are arranged side by side in the radial direction. At this time, however, the torque limiter portion 8 and the dynamic vibration absorber 9 may be positioned at the radially inner side of the coil springs 21.

The rotation member 4 includes, for example, the plate 11 and the connection member 14. In the third embodiment, the inner circumferential portion of the plate 11 is connected and fixed, together with the flywheel 12, to the output shaft 2 by means of the connection member 14. The plate 11 is rotatably connected to the cylindrical portion 29a of the hub member 29 by the bearing 41. The bearing 41 rotatably supports the inner circumferential portion of the plate 11 in a state where the bearing 41 is positioned and fitted to the cylindrical portion 29a at the radially outer side.

The rotation member 5 includes the first and second side plates 15 and 16, and the intermediate plate 17. In the third embodiment, a lining portion 17a is formed at the outer circumferential portion of the intermediate plate 17. The lining portion 17a of the third embodiment corresponds to the lining plate 18 of the first embodiment.

The rotation member 6 includes a plate 51 in addition to the hub member 29, the plate 30, and the pressure plate 31. The plate 51 formed by an annular member is arranged to overlap the flange portion 29b of the hub member 29 in the axial direction. For example, an outer circumferential portion of the plate 51 is positioned at the power source side of an outer circumferential portion of the flange portion 29b of the hub member 29. In addition, an outer circumferential portion of the plate 30 is positioned at the power source side of the outer circumferential portion of the plate 51. The outer circumferential portion of the plate 51 is connected and fixed, together with the plate 30, to the flange portion 29b by means of the connection member 32. The plate 51 covers a portion of the dynamic vibration absorber 9 at the power source side.

A bore 29d serving as the opening portion is formed at the flange portion 29b of the hub member 29. The bore 29d is arranged at a position overlapping the connection member 14 in the axial direction. Specifically, the bore 29d is arranged at the position overlapping the connection member 14 in the axial direction in a state where torsion is not generated at the damper portion 7. The bore 29d is provided so as to allow the connection member 14 to pass through the bore 29d and a usage of a tool for the connection member 14.

The pressure plate 31 is connected to the plate 51 to be relatively non-rotatable and axially movable. A portion of the pressure plate 31 is positioned at the power source side of the plate 51. In the third embodiment, the plate 30 covers at least the power source side of the pressure plate 31 in a state where the plate 30 is positioned away from the pressure plate 31.

In the third embodiment, the torque limiter portion 8 includes the lining portion 17a, instead of the lining plate 18 as in the first embodiment.

The first and second friction members 26 and 27 of the torque limiter portion 8 are positioned at the radially outer side of the coil springs 21 (the damper portion 7) to face the lining portion 17a in the axial direction. The first friction member 26 is positioned at the power source side of the lining portion 17a to be disposed between the lining portion 17a and the pressure plate 31. The first friction member 26 is held and connected to the pressure plate 31 to be relatively non-rotatable. For example, the first friction member 26 is held by the pressure plate 31 by means of a fitting structure including a projection and a bore. On the other hand, the second friction member 27 is positioned at the passive portion side of the lining portion 17a to be disposed between the lining portion 17a and the plate 51. The second friction member 27 is held and connected to the plate 51 to be relatively non-rotatable. For example, the second friction member 27 is held by the plate 51 by means of a fitting structure including a projection and a bore. At this time, the first and second friction members 26 and 27 may not be held by the pressure plate 31 and the plate 51 respectively and may be held by the intermediate plate 17 (the lining plate 17a) to be relatively non-rotatable. Facing areas, i.e., contact areas, of the first and second friction members 26 and 27 relative to the lining portion 17a in the axial direction form the transmission portion 8a transmitting torque by friction.

The disc spring 28 of the torque limiter portion 8 is disposed, for example, between the plate 30 and the pressure plate 31 to bias the first friction member 26 towards the lining portion 17a. Because of the biasing force of the disc spring 28, the first and second friction members 26 and 27 are in pressure contact with the lining portion 17a.

The dynamic vibration absorber 9 is accommodated within a holding portion 52 constituted by the flange portion 29b of the hub member 29 and the plate 51. The holding portion 52 is in an annular form, for example.

According to the aforementioned configuration of the third embodiment, the dynamic vibration absorber 9 may be protected in the same way as the first embodiment.

In addition, in the third embodiment, one of the torque limiter portion 8 (the transmission portion 8a) and the damper portion 7 (the coil springs 21) is positioned at the radially outer side of the other of the torque limiter portion 8 (the transmission portion 8a) and the damper portion 7 (the coil springs 21). Then, one of the dynamic vibration absorber 9 and the damper portion 7 (the coil springs 21) is positioned at the radially outer side of the other of the dynamic vibration absorber 9 and the damper portion 7 (the coil springs 21). Thus, arrangements of the damper portion 7 and the torque limiter portion 8, for example, may be easily performed.

Further, in the third embodiment, the transmission portion 8a and the dynamic vibration absorber 9 are positioned at the radially outer side of the coil springs 21. Thus, as compared to a case where the transmission portion 8a and the dynamic vibration absorber 9 are positioned at the radially inner side of the coil springs 21, for example, the vibration absorption performance of the dynamic vibration absorber 9 may increase.

Figure 5:
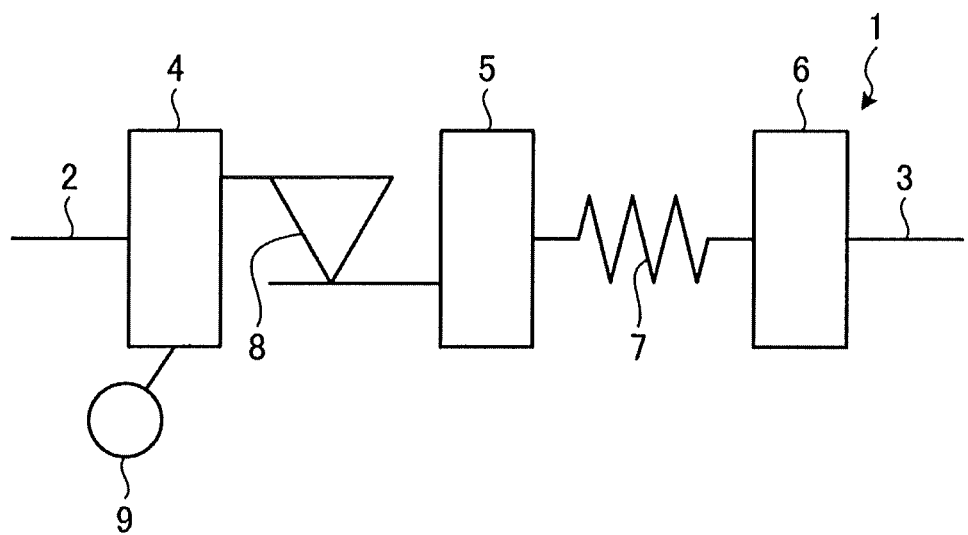
FIG. 5 is a schematic view of the power transmission apparatus according to a fourth embodiment disclosed here.
Figure 6:
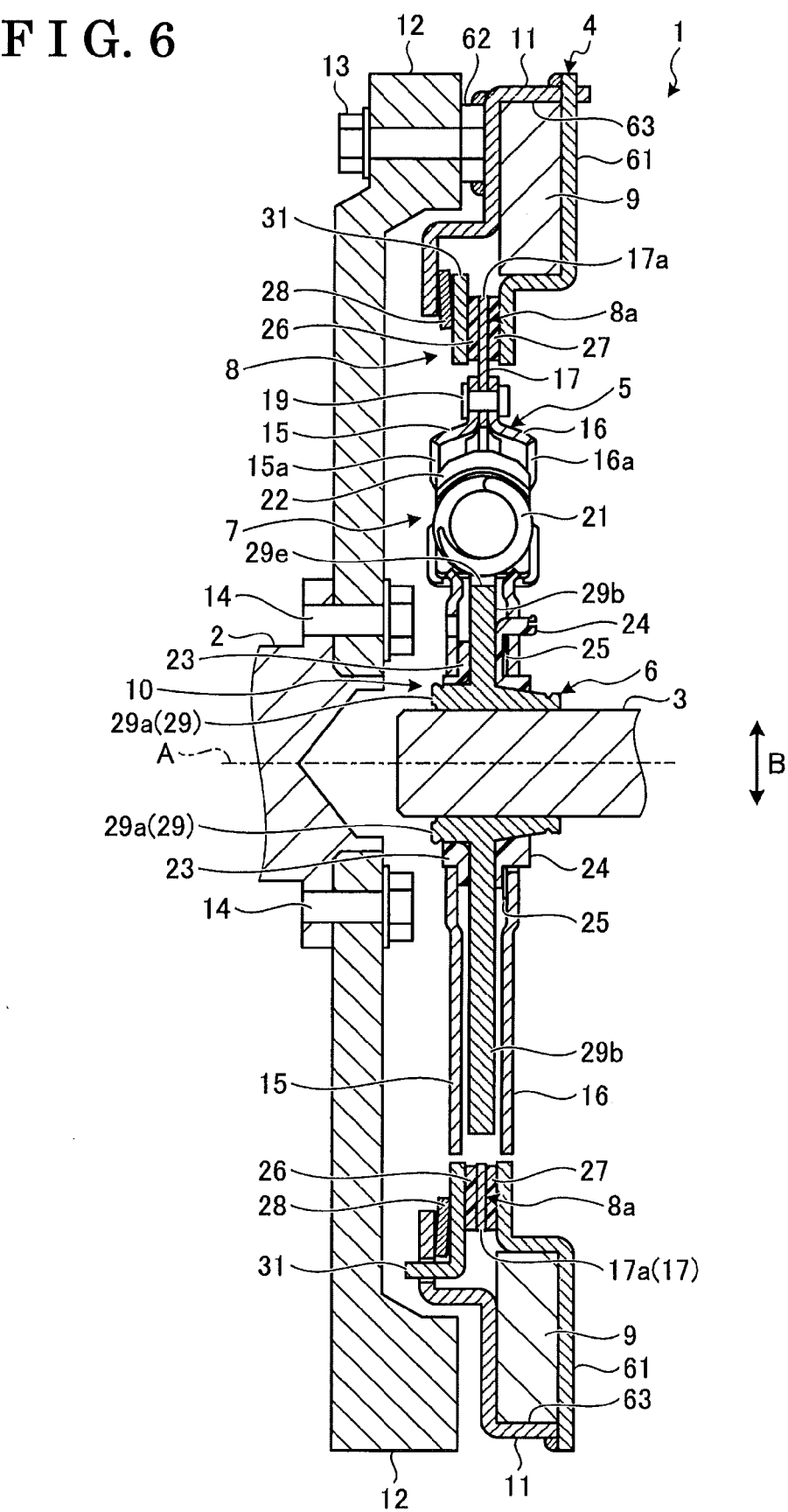
FIG. 6 is a cross-sectional view of the power transmission apparatus according to the fourth embodiment.

The fourth embodiment will be explained with reference to FIGS. 5 and 6. In the fourth embodiment, as illustrated in FIG. 5, the arrangements of the damper portion 7, the hysteresis portion 10 (see FIG. 6), the torque limiter portion 8, and the dynamic vibration absorber 9 are different from those of the first embodiment. In the fourth embodiment, the damper portion 7 and the hysteresis portion 10 are arranged between the rotation members 5 and 6, the torque limiter portion 8 is arranged between the rotation members 4 and 5, and the dynamic vibration absorber 9 is provided at the rotation member 4. In the fourth embodiment, the rotation member 6 serves as the first rotation member, the rotation member 4 serves as the second rotation member, and the rotation member 5 serves as the third rotation member. In addition, the input shaft 3 serves as the first rotation shaft and the output shaft 2 serves as the second rotation shaft. As understood from the fourth embodiment and the first to third embodiments, one of the first rotation shaft and the second rotation shaft is the output shaft 2 of the power source, and the other of the first rotation shaft and the second rotation shaft is the input shaft 3 of the passive portion, for example.

In the fourth embodiment, the configurations of the rotation members 4 to 6 are different from those of the first embodiment. As illustrated in FIG. 6, the rotation member 4 includes the plate 11, a plate 61, the connection members 13 (for example, bolts), and nuts 62.

The nuts 62 are fixed to a facing surface of the plate 11 facing the flywheel 12 by welding, for example. The nuts 62 are connected to the flywheel 12 by means of the connection members 13 so that the plate 11 is connected to the flywheel 12. The plural nuts 62 and the plural connection members 13 are provided in the circumferential direction.

The plate 61 is formed by an annular member and is positioned at the passive portion side of the plate 11. The plates 11 and 61 constitute a holding portion 63 accommodating the dynamic vibration absorber 9. The holding portion 63 is formed in an annular form, for example.

The rotation member 5 includes the first and second side plates 15 and 16, and the intermediate plate 17. The lining portion 17a is formed at the outer circumferential portion of the intermediate plate 17 in the fourth embodiment. The lining portion 17a of the fourth embodiment corresponds to the lining plate 18 of the first embodiment.

The rotation member 6 includes the hub member 29. Window portions 29e are formed at the hub member 29 in the fourth embodiment. For example, plural window portions 29e are formed at intervals in the circumferential direction. The window portions 29e include the same functions as the window portions 11a of the plate 11 in the first embodiment.

The torque limiter portion 8 according to the fourth embodiment transmits torque equal to or smaller than the predetermined value between the rotation members 4 and 5. In a case where torque greater than the predetermined value is input to the torque limiter portion 8, slippage is generated at the torque limiter portion 8 to restrict the torque transmitted between the rotation members 4 and 5 from exceeding the predetermined value.

In the fourth embodiment, the torque limiter portion 8 includes the lining portion 17a instead of the lining plate 18 as in the first embodiment. The first and second friction members 26 and 27 of the torque limiter portion 8 are positioned at the radially outer side of the coil springs 21 (the damper portion 7) to face the lining portion 17a in the axial direction. The first friction member 26 is positioned at the power source side of the lining portion 17a to be disposed between the lining portion 17a and the pressure plate 31 in the axial direction. The first friction member 26 is held or connected to the pressure plate 31 to be relatively non-rotatable. For example, the first friction member 26 may be held at the pressure plate 31 by means of a fitting structure including a projection and a bore. On the other hand, the second friction member 27 is positioned at the passive portion side of the lining portion 17a to be disposed between the lining portion 17a and the plate 61 in the axial direction. The second friction member 27 is held or connected to the plate 61 to be relatively non-rotatable. For example, the second friction member 27 is held by the plate 61 by means of a fitting structure including a projection and a bore. At this time, the first and second friction members 26 and 27 may not be held by the pressure plate 31 and the plate 61 respectively and may be held by the intermediate plate 17 (the lining portion 17a) to be relatively non-rotatable. Facing areas, i.e., contact areas, of the first and second friction members 26 and 27 relative to the lining portion 17a in the axial direction form the transmission portion 8a transmitting torque by friction.

The disc spring 28 of the torque limiter portion 8 is disposed, for example, between the plate 11 and the pressure plate 31 to bias the first friction member 26 towards the lining portion 17a. Because of the biasing force of the disc spring 28, the first and second friction members 26 and 27 are in pressure contact with the lining portion 17a.

The damper portion 7 according to the fourth embodiment absorbs torque fluctuation between the output shaft 2 and the input shaft 3 by the elastic deformation so as to transmit torque between the rotation members 5 and 6. In the damper portion 7, each of the coil springs 21 and the seat members 22 arranged at opposing ends of the coil spring 21 in the circumferential direction are accommodated within the window portions 15a, 16a, and 29e formed at the first and second side plates 15 and 16, and the hub member 29 respectively. The coil springs 21 are disposed between the first and second side plates 15 and 16, and the hub member 29. The damper portion 7 transmits the torque between the rotation members 5 and 6 and absorbs the torque fluctuation between the output shaft 2 and the input shaft 3 by the elastic deformation of the coil springs 21. Specifically, the coil springs 21 allow the relative rotation between the first and second side plates 15 and 16, and the hub member 29 within a predetermined range and contract by the relative rotation between the first and second side plates 15 and 16, and the hub member 29 to thereby absorb shock caused by a rotational difference between the first and second side plates 15 and 16, and the hub member 29.

In the hysteresis portion 10 of the fourth embodiment, the first and second thrust members 23 and 24 are positioned at the radially inner side of the coil springs 21 (the damper portion 7) to face the flange portion 29b of the hub member 29 in the axial direction. The first thrust member 23 is positioned at the power source side of the flange portion 29b to be disposed between the flange portion 29b and the first side plate 15 in the axial direction. The first thrust member 23 is engaged and connected to the first side plate 15 to be relatively non-rotatable and axially movable. On the other hand, the second thrust member 24 is positioned at the passive portion side of the flange portion 29b to be disposed between the flange portion 29b and the second side plate 16 in the axial direction. The second thrust member 24 is engaged and connected to the second side plate 16 to be relatively non-rotatable and axially movable. The disc spring 25 is disposed, for example, between the second thrust member 24 and the second side plate 16 to bias the second thrust member 24 towards the flange portion 29b. Because of the biasing force of the disc spring 25, the pair of thrust members, i.e., the first and second thrust members 23 and 24 is in pressure-contact with the flange portion 29b. At this time, the first and second thrust members 23 and 24 are slidable relative to the flange portion 29b in the circumferential direction. The hysteresis portion 10 damps or restrains the torque fluctuation between the output shaft 2 and the input shaft 3 by the hysteresis torque based on, for example, friction generated between the first and second thrust members 23 and 24, and the flange portion 29b. The first thrust member 23 is also disposed between the first side plate 15 and the flange portion 29b in the radial direction to function as a sliding bearing, i.e., a bush for allowing a relative rotation between the first side plate 15 and the flange portion 29b.

According to the fourth embodiment, one of the torque limiter portion 8 (the transmission portion 8a) and the damper portion 7 (the coil springs 21) is positioned at the radially outer side of the other of the torque limiter portion 8 (the transmission portion 8a) and the damper portion 7 (the coil springs 21). In addition, one of the dynamic vibration absorber 9 and the damper portion 7 (the coil springs 21) is positioned at the radially outer side of the other of the dynamic vibration absorber 9 and the damper portion 7 (the coil springs 21). Specifically, the torque limiter portion 8 and the dynamic vibration absorber 9 are positioned at the radially outer side of the coil springs 21.

In the fourth embodiment, the dynamic vibration absorber 9 is positioned at the radially outer side of the transmission portion 8a.

As explained above, in the fourth embodiment, the damper portion 7 is provided between the rotation members 5 and 6, the dynamic vibration absorber 9 is provided at the rotation member 4, and the torque limiter portion 8 is provided between the rotation members 4 and 5. Thus, in a case where the damper portion 7 resonates and the torque limiter portion 8 receives the torque greater than the predetermined value, the torque limiter portion 8 restricts the torque transmitted between the rotation members 4 and 5 from exceeding the predetermined value. Thus, a relatively large vibration, i.e., a relatively large torque, may be restrained from being input to the dynamic vibration absorber 9. As a result, in the present embodiment, the dynamic vibration absorber 9 may be protected and further a long life span of the dynamic vibration absorber 9 may be achieved.

In addition, according to the fourth embodiment, the dynamic vibration absorber 9 is positioned at the radially outer side of the transmission portion 8a. Thus, as compared to a case where the dynamic vibration absorber 9 is positioned at the radially inner side of the transmission portion 8a, for example, the vibration absorption performance of the dynamic vibration absorber 9 may increase.

Further, according to the fourth embodiment, one of the torque limiter portion 8 (the transmission portion 8a) and the damper portion 7 (the coil springs 21) is positioned at the radially outer side of the other of the torque limiter portion 8 (the transmission portion 8a) and the damper portion 7 (the coil springs 21). Then, one of the dynamic vibration absorber 9 and the damper portion 7 (the coil springs 21) is positioned at the radially outer side of the other of the dynamic vibration absorber 9 and the damper portion 7 (the coil springs 21). Thus, the arrangements of the damper portion 7 and the torque limiter portion 8, for example, may be easily performed.

Furthermore, according to the fourth embodiment, the transmission portion 8a and the dynamic vibration absorber 9 are positioned at the radially outer side of the coil springs 21. Thus, as compared to a case where the transmission portion 8a and the dynamic vibration absorber 9 are positioned at the radially inner side of the coil springs 21, for example, the vibration absorption performance of the dynamic vibration absorber 9 may increase.

The first to fourth embodiments are not limited to include the aforementioned configurations and may be appropriately modified or changed.

According to the first to fourth embodiments, in a case where torque greater than the predetermined value is input to the torque limiter portion 8 in a state where the damper portion 7 resonates, for example, the torque limiter portion 8 restricts torque transmitted between the second rotation member (the rotation member 6, 4) and the third rotation member (the rotation member 5) from exceeding the predetermined value. Thus, a relatively large vibration (i.e., a relatively large torque) is restrained from being input to the dynamic vibration absorber 9, for example. Consequently, the dynamic vibration absorber 9 may be protected, for example.

In addition, according to the first to fourth embodiments, the torque limiter portion 8 includes the transmission portion 8a transmitting torque by friction, one of the dynamic vibration absorber 9 and the transmission portion 8a being arranged at the outer side of the other of the dynamic vibration absorber 9 and the transmission portion 8a in the radial direction of the first rotation member (the rotation member 4, 6).

Accordingly, for example, the arrangements of the dynamic vibration absorber 9 and the transmission portion 8a may be easily performed.

Further, according to the first and fourth embodiments, the dynamic vibration absorber 9 is positioned at the outer side of the transmission portion 8a in the radial direction.

Accordingly, as compared to a case where the dynamic vibration absorber 9 is positioned at the inner side of the transmission portion 8a in the radial direction, for example, the vibration absorption performance of the dynamic vibration absorber 9 may increase.

Furthermore, according to the second embodiment, the transmission portion 8a is positioned at the outer side of the dynamic vibration absorber 9 in the radial direction.

Accordingly, the dynamic vibration absorber 9 may be protected, for example.

Furthermore, according to the first to fourth embodiments, the damper portion 7 includes the coil spring 21 absorbing torque fluctuation between the fist rotation shaft (the output shaft 2 or the input shaft 3) and the second rotation shaft (the input shaft 3 or the output shaft 2), and the torque limiter portion 8 includes the transmission portion 8a transmitting torque by friction. One of the transmission portion 8a and the coil spring 21 is provided at the outer side of the other of the transmission portion 8a and the coil spring 21 in the radial direction of the first rotation member (the rotation member 4, 6), and one of the dynamic vibration absorber 9 and the coil spring 21 is provided at the outer side of the other of the dynamic vibration absorber 9 and the coil spring 21 in the radial direction.

Accordingly, for example, the arrangements of the damper portion 7 and the torque limiter portion 8 may be easily performed.

Furthermore, according to the third and fourth embodiments, the transmission portion 8a and the dynamic vibration absorber 9 are provided at the inner side of the coil spring 21 in the radial direction.

Accordingly, as compared to a case where the transmission portion 8a and the dynamic vibration absorber 9 are arranged at the inner side of the coil spring 21 in the radial direction, for example, the vibration absorption performance of the dynamic vibration absorber 9 may increase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A power transmission apparatus comprising:
   a first rotation member connected to a first rotation shaft to be integrally rotatable with the first rotation shaft;

a second rotation member connected to a second rotation shaft to be integrally rotatable with the second rotation shaft;

a third rotation member provided between the first rotation member and the second rotation member to be integrally rotatable with the first rotation member and the second rotation member;

a damper portion provided between the first rotation member and the third rotation member to absorb a torque fluctuation between the first rotation shaft and the second rotation shaft;

a torque limiter portion arranged between the second rotation member and the third rotation member to transmit a torque equal to or smaller than a predetermined value between the second rotation member and the third rotation member, the torque limiter portion restricting a torque transmitted between the second rotation member and the third rotation member from exceeding the predetermined value in a case where a torque greater than the predetermined value is input to the torque limiter portion; and a dynamic vibration absorber provided at the second rotation member.

2. The power transmission apparatus according to claim 1, wherein the torque limiter portion includes a transmission portion transmitting a torque by friction, one of the dynamic vibration absorber and the transmission portion being arranged at an outer side of the other of the dynamic vibration absorber and the transmission portion in a radial direction of the first rotation member.

3. The power transmission apparatus according to claim 2, wherein the dynamic vibration absorber is positioned at the outer side of the transmission portion in the radial direction.

4. The power transmission apparatus according to claim 2, wherein the transmission portion is positioned at the outer side of the dynamic vibration absorber in the radial direction.

5. The power transmission apparatus according to claim 1, wherein the damper portion includes a spring absorbing a torque fluctuation between the first rotation shaft and the second rotation shaft, and the torque limiter portion includes a transmission portion transmitting a torque by friction, and wherein one of the transmission portion and the spring is provided at an outer side of the other of the transmission portion and the spring in a radial direction of the first rotation member, and one of the dynamic vibration absorber and the spring is provided at an outer side of the other of the dynamic vibration absorber and the spring in the radial direction.

6. The power transmission apparatus according to claim 5, wherein the transmission portion and the dynamic vibration absorber are provided at an inner side of the spring in the radial direction.

7. The power transmission apparatus according to claim 1, wherein the second rotation member possesses a lining portion positioned between the first rotation member and a portion of the third rotation member.

8. The power transmission apparatus according to claim 1, wherein
the second rotation member includes a lining member,
the third rotation member possesses a first plate and a second plate, and
the lining member of the second rotation member is located between the first plate and the second plate of the third rotation member.

9. The power transmission apparatus according to claim 1, wherein
the second rotation member comprises a hub, a first plate, and a second plate, the first plate possessing a lining portion extending radially outwards of the second plate;
the third rotation member possesses an inner plate and a cover plate; and
the lining portion of the first plate of the second rotation member is positioned between at least a portion of the inner plate and the cover plate of the third rotation member in the axial direction, and the lining portion is positioned to overlap at least a portion of the first plate and a portion of the second plate of the third rotation member in the radial direction.

10. The power transmission apparatus according to claim 1, wherein
the first rotation shaft and the second rotation shaft are configured to rotate around a center axis;
the first rotation member comprises a connection member positioned at an outer radial circumference of the first rotation member;
the third rotation member comprises an opening positioned at an outer radial circumference of the third rotation member; and
the opening and the connection member are equidistant in the radial direction from the center axis.

11. The power transmission apparatus according to claim 10, wherein
the opening and the connection member are configured to axially overlap when no torque is generated at the damper portion; and
when the opening and the connection member axially overlap, the connection member is accessible by a tool through the opening.

12. A power transmission apparatus comprising:
a first rotation member connected to a first rotation shaft to be integrally rotatable with the first rotation shaft of a power source;
a second rotation member connected to a second rotation shaft to be integrally rotatable with the second rotation shaft of a passive portion;
a third rotation member provided between the first rotation member and the second rotation member to be integrally rotatable with the first rotation member and the second rotation member;
a damper portion provided between the first rotation member and the third rotation member to absorb a torque fluctuation between the first rotation shaft and the second rotation shaft;
a torque limiter portion arranged between the second rotation member and the third rotation member to transmit a torque equal to or smaller than a predetermined value between the second rotation member and the third rotation member, the torque limiter portion restricting a torque transmitted between the second rotation member and the third rotation member from exceeding the predetermined value in a case where a torque greater than the predetermined value is input to the torque limiter portion; and
a dynamic vibration absorber provided at the second rotation member.

13. The power transmission apparatus according to claim 12, wherein the torque limiter portion includes a transmission portion transmitting a torque by friction, one of the dynamic vibration absorber and the transmission portion being arranged at an outer side of the other of the dynamic vibration absorber and the transmission portion in a radial direction of the first rotation member.

14. The power transmission apparatus according to claim 13, wherein the dynamic vibration absorber is positioned at the outer side of the transmission portion in the radial direction.

15. The power transmission apparatus according to claim 13, wherein the transmission portion is positioned at the outer side of the dynamic vibration absorber in the radial direction.

16. The power transmission apparatus according to claim 12, wherein the damper portion includes a spring absorbing a torque fluctuation between the first rotation shaft and the second rotation shaft, and the torque limiter portion includes a transmission portion transmitting a torque by friction, and wherein one of the transmission portion and the spring is provided at an outer side of the other of the transmission portion and the spring in a radial direction of the first rotation member, and one of the dynamic vibration absorber and the spring is provided at an outer side of the other of the dynamic vibration absorber and the spring in the radial direction.

17. The power transmission apparatus according to claim 16, wherein the transmission portion and the dynamic vibration absorber are provided at an inner side of the spring in the radial direction.

* * * * *